(12) United States Patent
Appelo et al.

(10) Patent No.: US 11,092,980 B2
(45) Date of Patent: Aug. 17, 2021

(54) PULSE VALVE WITH PRESSURE VESSEL PENETRATION

(71) Applicant: General Electric Technology GmbH, Baden (CH)

(72) Inventors: Per-Erik Albert Appelo, Knoxville, TN (US); Abdul Basheer Kuttecheri, Andaman and Nicobar Islands (IN)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 240 days.

(21) Appl. No.: 15/353,097

(22) Filed: Nov. 16, 2016

(65) Prior Publication Data
US 2018/0136671 A1    May 17, 2018

(51) Int. Cl.
| | |
|---|---|
| *B01D 46/00* | (2006.01) |
| *G05D 7/06* | (2006.01) |
| *B01D 46/02* | (2006.01) |
| *B01D 46/04* | (2006.01) |
| *B01D 46/42* | (2006.01) |
| *F16K 27/02* | (2006.01) |
| *F16K 31/42* | (2006.01) |

(52) U.S. Cl.
CPC ....... *G05D 7/0635* (2013.01); *B01D 46/0068* (2013.01); *B01D 46/02* (2013.01); *B01D 46/023* (2013.01); *B01D 46/04* (2013.01); *B01D 46/4272* (2013.01); *F16K 27/0263* (2013.01); *F16K 31/423* (2013.01)

(58) Field of Classification Search
CPC .. G05D 7/0635; B01D 46/00; B01D 46/0068; B01D 46/02; B01D 46/023; B01D 46/04; B01D 46/4272; F16K 27/0263; F16K 31/1223; F16K 31/423

USPC ...................................... 55/282–305; 95/280
See application file for complete search history.

(56) References Cited

U.S. PATENT DOCUMENTS

| | | | |
|---|---|---|---|
| 865,479 | A | 9/1907 | Cooper |
| 914,886 | A | 3/1909 | Schreidt |
| 926,400 | A | 6/1909 | Freaney |
| 1,548,093 | A | 8/1925 | McCormick |
| 2,476,400 | A | 7/1949 | Berkholder |
| 2,541,176 | A | 2/1951 | Rockwell |
| 3,253,615 | A | 5/1966 | Armstrong |

(Continued)

FOREIGN PATENT DOCUMENTS

| | | |
|---|---|---|
| CN | 2191330 Y | 3/1995 |
| CN | 200961711 Y | 10/2007 |

(Continued)

OTHER PUBLICATIONS

U.S. Final Office Action issued in connection with related U.S. Appl. No. 14/850,208 dated May 22, 2017.

(Continued)

*Primary Examiner* — T. Bennett McKenzie
(74) *Attorney, Agent, or Firm* — Grogan, Tuccillo & Vanderleeden, LLP

(57) ABSTRACT

A valve with relatively reduced tank penetration is useful for cleaning at least a portion of a filter unit, such as multiple filter bags, arranged in a filter installation for filtering polluted gas passed therethrough. This valve is preferably a relatively high performance pulse valve of relatively small pressure vessel penetration cross section area useful with relatively lower cost pressure vessels.

9 Claims, 5 Drawing Sheets

(56) References Cited

U.S. PATENT DOCUMENTS

| | | | |
|---|---|---|---|
| 3,446,473 A | | 5/1969 | Barker |
| 4,033,732 A | * | 7/1977 | Axelsson ........... B01D 46/0068 95/280 |
| 4,190,230 A | | 2/1980 | Geissbuhler |
| 4,198,029 A | | 4/1980 | Johnson |
| 4,760,865 A | | 8/1988 | Rilett |
| 4,793,589 A | | 12/1988 | Eldredge et al. |
| 5,002,594 A | | 3/1991 | Merritt |
| 5,042,775 A | | 8/1991 | Willemsen |
| 5,178,652 A | | 1/1993 | Huttlin |
| 5,524,903 A | | 6/1996 | Messina |
| 5,533,706 A | * | 7/1996 | Aurell ................ B01D 46/0068 251/44 |
| 5,657,790 A | | 8/1997 | Mohn |
| 5,887,973 A | | 3/1999 | Ahman et al. |
| 7,204,211 B2 | | 4/2007 | Kenchington et al. |
| 2005/0210842 A1 | * | 9/2005 | McCausland ...... B01D 46/0068 55/302 |
| 2006/0123753 A1 | | 6/2006 | Sugiura et al. |
| 2008/0022641 A1 | | 1/2008 | Engelland et al. |
| 2008/0250762 A1 | * | 10/2008 | Brown .................. B01D 46/02 55/283 |
| 2010/0013112 A1 | * | 1/2010 | Forkosh ................ F24F 3/1417 261/128 |
| 2010/0108927 A1 | | 5/2010 | Perz et al. |
| 2011/0000174 A1 | | 1/2011 | Kapelarie et al. |
| 2011/0206572 A1 | | 8/2011 | McKenna et al. |
| 2012/0073251 A1 | | 3/2012 | Troxell et al. |
| 2012/0138104 A1 | | 6/2012 | Haynam et al. |
| 2013/0153039 A1 | | 6/2013 | Deubler |
| 2014/0332038 A1 | | 11/2014 | Appelo |
| 2014/0332039 A1 | | 11/2014 | Appelo |
| 2014/0332702 A1 | | 11/2014 | Hjelmberg et al. |
| 2016/0074798 A1 | | 3/2016 | Appelo |
| 2016/0076665 A1 | | 3/2016 | Appelo |

FOREIGN PATENT DOCUMENTS

| | | |
|---|---|---|
| CN | 101293158 A | 10/2008 |
| CN | 201462062 U | 5/2010 |
| CN | 101879395 A | 11/2010 |
| CN | 202158221 U | 3/2012 |
| CN | 202460368 U | 10/2012 |
| EP | 1085244 A2 | 3/2001 |
| EP | 1493480 A1 | 1/2005 |
| EP | 2390539 A1 | 11/2011 |
| EP | 2 626 122 A1 | 8/2013 |
| EP | 2 803 886 A2 | 11/2014 |
| EP | 2803886 A2 * | 11/2014 ............ F16K 15/02 |
| FR | 2652631 A1 | 4/1991 |
| WO | 91/19922 A1 | 12/1991 |
| WO | 97/18026 A1 | 5/1997 |
| WO | 00/69544 A1 | 11/2000 |
| WO | 01/29465 A1 | 4/2001 |
| WO | 2013/138092 A2 | 9/2013 |
| WO | 2015/112548 A1 | 7/2015 |

OTHER PUBLICATIONS

Goyen CP Series—Close Pitched Valve—Aluminum Body X-Spool, Rev. 01, Apr. 2015.
Goyen CP Series—Close Pitched Valve—Manifold System, Rev. 01, Apr. 2015.
Solenoid Diaphragm Valves for Bag House (HJ/T284=600), State Environmental Protection Administration, Jul. 28, 2006, p. 63.
Trimec Dust Filters Compnents: SPV High Efficiency Sonic Piston Valve, 2010, pp. 1-4, TRIMEC S.r.l.—Via Gramsci, 57-20032 Cormaho (Milano)—Italy. www.trimecvalves.com.
Non-Final Rejection towards related U.S. Appl. No. 13/892,683 dated Aug. 5, 2016.
Non-Final Rejection towards related U.S. Appl. No. 14/488,642 dated Mar. 1, 2017.
International Search Report and Written Opinion issued in connection with corresponding PCT Application No. PCT/EP2017/078105 dated Feb. 7, 2018.
U.S. Non-Final Office Action issued in connection with Related U.S. Appl. No. 14/850,208 dated Dec. 9, 2016.

* cited by examiner

PULSE VALVE WITH PRESSURE VESSEL PENETRATION

FIELD OF THE DISCLOSURE

In general, the present disclosure relates to a valve useful for cleaning at least a portion of a filter unit, such as filter bags, arranged in a filter installation useful for filtering polluted gas passed therethrough. More specifically, the present disclosure relates to a relatively high performance pulse valve of relatively small pressure vessel penetration cross section area useful for relatively lower cost pressure vessel installation.

BACKGROUND OF THE DISCLOSURE

Commercial "bag house" type filter installations typically consist of a plurality of parallel filter units. Each such filter unit contains a plurality of parallel rows of vertically arranged filter elements in the form of filter bags. Each such filter bag has a top end opening. A gas polluted with particulates is channeled through the filter bags to filter and collect particulates entrained in the gas. Hence, upon filtering and collecting the particulates entrained in the gas, a "cleaned gas" is produced. More specifically, this cleaned gas is produced by channeling a polluted gas into a filter installation for passage through one or more filter units comprising a plurality of filter bags for gas flow from an exterior surface of a filter bag through to an interior area within the filter bag via a flow path through sides of the filter bag. As the polluted gas passes from the exterior surface of the filter bag through to the interior area within the filter bag, particulate pollutants entrained in the gas are filtered and collected forming dust cakes on the exterior surfaces of the plurality of filter bags. Hence, gas in the interior area of the filter bag is the so produced cleaned gas. Cleaned gas exits the interior area of the filter bag via the top end opening in each of the plurality of filter bags. Cleaned gas flows from the top end openings through an outlet duct common to the filter units. During operation of the filter installation, a negative pressure is typically generated by a fan arranged downstream of the filter installation to cause gas flow through the filter units and filter bags.

As noted above, dust and particulates entrained in the polluted gas are filtered by and collected on the exterior surfaces of the filter bags, thus forming dust cakes thereon. Cleaning of the filter bags to remove the dust cakes is necessary for effective and efficient equipment performance. Cleaning of the filter bags is accomplished using a pressure medium typically in the form of compressed air pulses injected into the filter bags in a direction opposite to that of gas filtering. Rows of filter bags are cleaned successively using cleaning units arranged for each such given row. A cleaning unit cleans a row of filter bags by generating a compressed air pulse delivered substantially simultaneously to each filter bag in the given row. More specifically, each cleaning unit comprises a nozzle pipe arranged above and extending the length of the associated row of filter bags for cleaning. Each nozzle pipe typically has a plurality of vertically downwardly projecting pipe sockets connected thereto. Each pipe socket is positioned straight above a filter bag top end opening within the associated row. The function of these pipe sockets is to direct via nozzles compressed air pulses into the respective filter bag top end openings. The pipe sockets usually have a diameter of about 1.5 to 2 times greater than the diameter of the nozzle associated therewith. The nozzles associated therewith typically consist of circular holes of varying diameter formed in the nozzle pipe. The varying diameter of the circular holes along the nozzle pipe is determined empirically based on the total number of pipe sockets/nozzles, requiring a uniform distribution of compressed air pulsed therethrough. As such, circular holes arranged in the nozzle pipe are smaller or larger in diameter depending on the circular holes' distance from the nozzle pipe inlet. By so varying the diameter of the circular holes, a uniform distribution of compressed air pulsed therethrough is achieved.

In the cleaning of filter bags using a pulse of compressed air, a valve is temporarily opened to establish fluid flow between a compressed air tank or pressure vessel and the nozzle pipe. Upon fluid flow between the compressed air tank or pressure vessel and the nozzle, compressed air is pulsed through the nozzle pipe and its associated pipe sockets and nozzles. As such, a compressed air pulse is supplied to each of the filter bags in the associated row of filter bags. Compressed air pulses supplied to the filter bags dislodge dust and particulates that collect and cake in and on the walls of the filter bags. Dust cakes formed on the filter bags are thereby loosened by the flow of compressed air from the interior areas of the filter bags, through the filter bag side walls, to an area in the filter unit exterior thereto. The resultant loosened dust cakes fall off the exterior of the filter bags for hopper collection.

In operating a cleaning unit, it is essential that the above-described pulse valve delivers a cleaning pulse of compressed air at a relatively high pressure with a relatively low consumption of compressed air. Pulse valves function by a cavity behind a plunger or membrane emptying through either a solenoid valve or a pilot valve, whereby the plunger or membrane is displaced by the differential pressure between the pressure vessel or air tank pressure on one side of the plunger or membrane and the cavity pressure on the other side of the plunger or membrane. The plunger or membrane undergoes considerable acceleration and achieves considerable velocity upon displacement as a result of this pressure differential. Eventually the plunger or membrane impacts an end position with very high momentum. The plunger or membrane impacting the end position with very high momentum creates a significantly loud noise upon impact. Likewise, when the plunger or membrane impacts the end position, such impact creates relatively high mechanical stresses. Mechanical stresses on the valve shorten the operational life expectancy of the valve and add to the system's operation costs when performance is hampered and/or replacement is necessary. Installation and replacement of valves on compressed air tanks or pressure vessels typically require bolting of the valve for installation or replacement to a flange welded to the compressed air tank or pressure vessel. Welding of the flanges to the compressed air tank or pressure vessel is relatively costly due to the relatively large amount of welding required therefor. Bolting valves to tanks or vessels requires a relatively large valve outer diameter to accommodate the bolts. As such, these relatively large diameter valves must sometimes be staggered in their placement within the tanks or vessels in order to accommodate their larger size. Such is especially true when smaller valve pitches, i.e., smaller distances between valves, must be avoided to maintain tank or vessel integrity. Staggered placement of valves is also relatively costly. Hence, to increase system performance and decrease system operational costs, a valve with decreased mechanical stresses, decreased installation and replacement costs, and increased operational life expectancy is desired.

SUMMARY OF THE DISCLOSURE

In view of the above, disclosed herein is a relatively high performance pulse valve of relatively small pressure vessel penetration cross section area. Also disclosed herein is a method of using the subject pulse valve of relatively small pressure vessel penetration cross section area for pulsed compressed gas cleaning of a plurality of filter elements, such as filter bags. The subject pulse valve requires decreased or no installation welding thereby reducing costs associated therewith. Also, the subject pulse valve has a relatively small rectangular valve housing that is not bolted to the pressure vessel, thus reducing valve spacing requirements and costs associated therewith. The relatively small pressure vessel penetration cross section area of the subject pulse valve is important in that it reduces tank or pressure vessel thickness requirements, thereby also reducing costs associated with having to use thicker walled compressed gas tanks or pressure vessels. A plunger with two areas of differing sizes arranged within the valve housing of the subject pulse valve also provides for high performance filter cleaning. As such, the subject pulse valve with a relatively small pressure vessel penetration cross section area is useful for efficient pulsed compressed gas cleaning of at least a portion of a filter unit.

The subject pulse valve with relatively small pressure vessel penetration cross section area comprises a valve housing with a plunger comprising two areas of differing sizes slideably arranged therein. The valve housing is arranged in an opening of a pressure vessel, or compressed gas tank, containing a compressed gas such as air, carbon dioxide, or other relatively low cost gas having a pressure of about 10 pounds per square inch (psi) to about 145 psi, or about 60 psi. The valve housing is air tightly fixed in a valve opening of the pressure vessel by threaded engagement of a tubular extension thereof within a free end of a nozzle pipe arranged within the pressure vessel. From the free end of the nozzle pipe, the nozzle pipe extends through a pipe opening of the pressure vessel opposite the valve opening of the pressure vessel. A rectangular opening portion of the valve housing is sized with a relatively small vessel penetration cross section area for mating arrangement within the valve opening of the compressed gas tank or pressure vessel. The rectangular opening portion of the valve housing is equipped with an exteriorly threaded tubular extension suitable for threaded engagement thereof with interiorly threaded free end of the nozzle pipe. Once threadedly engaged within the free end of the nozzle pipe, one or more openings formed within the rectangular opening portion of the valve housing allow for a flow of compressed gas to pass from the pressure vessel through the valve housing and into the fluidly connected nozzle pipe. Compressed gas flowing through the nozzle pipe effectively cleans at least a portion of a filter unit when the plunger is in a first "opened" position.

A fluid supply is fluidly connected to a solenoid valve integrally formed with or installed on the valve housing. The fluid supply supplies a fluid, such as air or another relatively inexpensive gas, via the solenoid valve to an interior vault or cavity within the valve housing. Filling of the interior vault or cavity with fluid causes a downward movement of the plunger within the valve housing to a second "closed" position. When in the second closed position, the plunger blocks the one or more openings within the rectangular opening portion of the valve housing and thus blocks the flow of compressed gas from the compressed gas tank or pressure vessel to the nozzle pipe. Compressed gas contained in the pressure vessel or compressed gas tank has a pressure of about 10 psi to about 145 psi, or about 60 psi. When the plunger is in the first open position, the fluid pressure within the interior vault or cavity of the valve housing is significantly less than that of the compressed gas within the compressed gas tank or pressure vessel. When the plunger is in the second closed position, the fluid pressure within the interior vault or cavity of the valve housing is equal or greater than that of the compressed gas within the compressed gas tank or pressure vessel and significantly greater than the pressure within the nozzle pipe.

A dampening mechanism, such as one or more cushions, is arranged inside the valve housing to reduce or dampen the impact between the interior surface of the housing top and the top surface of the plunger upon movement of the plunger into the first open position. Cushioning the impact between the interior surface of the housing top and the top surface of the plunger reduces mechanical stresses caused by such impacts and improves pulse valve reliability even with higher pressures within the pressure vessel or the compressed gas tank. The internal dampening mechanism likewise reduces the impact noise of the plunger upon displacement or movement of the plunger within the valve housing into the first open position. In addition to the dampening mechanism, fluid within the interior vault or cavity of the valve housing provides a cushioning effect that reduces impact and impact noise of the plunger upon movement thereof within the valve housing into the first open position.

A method of using the subject pulse valve for cleaning at least a portion of a filter unit comprises reducing fluid pressure within an interior vault or cavity of a valve housing to cause pressure differential displacement or movement of a plunger within the valve housing into a first open position allowing for a flow of compressed gas to pass from a pressure vessel or compressed gas tank through the valve housing to a nozzle pipe in fluid connection with a filter unit, thereby cleaning the filter unit with a pulse of compressed gas. Increasing fluid pressure within an interior vault or cavity of the valve housing likewise causes pressure differential displacement or movement of the plunger within the valve housing into a second closed position blocking flow of compressed gas from the pressure vessel or compressed gas tank from passing through the valve housing, and hence blocking flow of compressed gas to the nozzle pipe, until a further pulse cleaning of the filter unit is indicated by buildup of a filter dust cake.

For purposes of this method, the compressed gas in the compressed gas tank or pressure vessel has a pressure of about 10 psi to about 145 psi, or about 60 psi. When the plunger is in the first open position, the fluid pressure within the interior vault or cavity of the valve housing is significantly less than that of the compressed gas within the pressure vessel or compressed gas tank. When the plunger is in the second closed position, the fluid pressure within the interior vault or cavity of the valve housing is equal or greater than that of the compressed gas within the compressed gas tank or pressure vessel and significantly greater than that within the nozzle pipe. Pressure within the valve housing is controlled using a solenoid valve or the like for purposes of the subject method to control fluid flow into the interior vault or cavity of the valve housing to thus control the pressure differential between that of the interior vault or cavity and that of the pressure vessel or compressed gas tank.

The subject method further comprises providing a dampening mechanism within the valve housing to reduce or cushion the impact between the interior surface of the housing top and the top surface of the plunger upon movement of the plunger within the valve housing into the first open position. Providing a dampening mechanism as herein described also reduces the impact noise of the plunger with the valve housing upon movement of the plunger within the valve housing into the first open position. Fluid within the interior vault or cavity of the valve housing likewise provides a cushioning effect to reduce impact and impact noise of the plunger upon movement of the plunger within the valve housing into the first open position.

The subject pulse valve and method for using the same to clean at least a portion of a filter unit, such as filter bags, arranged in a filter installation to filter polluted gas passed therethrough includes among other features noted, a relatively small pressure vessel penetration cross section area, and no bolt, no weld or low weld installation, to reduce costs while not jeopardizing reliability or efficiency.

In summary, a pulse valve is provided useful for pulsed compressed gas cleaning of a filter unit. The pulse valve comprises a valve housing with a plunger slideably arranged therein removably fixed within a valve opening of a compressed gas tank or pressure vessel containing compressed gas and removably threadedly fixed to a nozzle pipe within the pressure vessel for a fluid connection thereto, one or more openings in the valve housing for a flow of compressed gas from the compressed gas tank or pressure vessel through the openings, through the valve housing and into the nozzle pipe useful for cleaning at least a portion of a filter unit when the plunger is in an open position, and a fluid supply on the valve housing for control of a flow of fluid to a vault or cavity within the valve housing to cause movement of the plunger within the valve housing to a closed position for blocking the one or more openings in the valve housing to block the flow of compressed gas from the compressed gas tank or pressure vessel to the nozzle pipe. The compressed gas in the compressed gas tank or pressure vessel has a pressure of about 10 psi to about 145 psi, or about 60 psi. When the plunger is in the closed position, the fluid pressure within the vault or cavity of the valve housing is equal or greater than that of the compressed gas within the compressed gas tank or pressure vessel and significantly greater than that within the nozzle pipe. When the plunger is in the open position, the fluid pressure within the vault or cavity of the valve housing is less than that of the compressed gas within the compressed gas tank or pressure vessel. Also, the valve housing further comprises a dampening mechanism to reduce impact between the interior surface of the housing top and the top surface of the plunger upon movement of the plunger within the valve housing into the open position. The dampening mechanism also reduces impact noise of the plunger upon movement of the plunger within the valve housing into the open position. Further, a solenoid valve is either integrally formed with or attached to the valve housing, with a fluid supply fluidly connected directly thereto or via tubing. As such, the solenoid valve is fluidly connected to the valve housing to control fluid flow to and from the vault or cavity of the valve housing.

In summary, a method is provided for using a pulse valve for cleaning at least a portion of a filter unit. The method comprises increasing fluid pressure within a vault or cavity of a valve housing causing pressure movement of a plunger within the valve housing into a closed position blocking flow of compressed gas from a compressed gas tank or pressure vessel through the valve housing to a nozzle pipe, and decreasing fluid pressure within a vault or cavity of a valve housing causing pressure movement of the plunger within the valve housing into an opened position allowing flow of compressed gas to pass from a compressed gas tank or pressure vessel through the valve housing and into a nozzle pipe in fluid connection with a filter unit thereby pulse cleaning the filter unit. The compressed gas in the compressed gas tank or pressure vessel has a pressure of about 10 psi to about 145 psi, or about 60 psi. When the plunger is in the closed position, the fluid pressure within the vault or cavity of the valve housing is equal to or greater than that of the compressed gas within the compressed gas tank or pressure vessel, and significantly greater than that within the nozzle pipe. When the plunger is in the open position, the fluid pressure within the vault or cavity of the valve housing is less than that of the compressed gas within the compressed gas tank and pressure vessel. A dampening mechanism is also provided to reduce impact between the interior surface of the housing top and the top surface of the plunger upon movement of the plunger within the valve housing into the open position. The dampening mechanism is also used to reduce impact noise of the plunger upon movement of the plunger within the valve housing into the open position. A solenoid valve is integrally formed with or attached to the valve housing, with a fluid supply fluidly connected directly thereto or via tubing for controlling movement of the plunger. As such, the solenoid valve is fluidly connected to the valve housing to control fluid flow from the fluid supply to the vault or cavity of the valve housing to control movement of the plunger. By controlling movement of the plunger within the valve housing, the solenoid valve fluidly connected to the valve housing also controls flow of compressed gas to the nozzle pipe and cleaning of the filter unit.

In summary, the present disclosure provides a plant comprising a pulse valve arranged within a valve opening in a compressed gas tank or pressure vessel containing compressed gas, and connected to a pipe arranged in a pipe opening of the compressed gas tank or pressure vessel, a control device operable to electronically control operation of a solenoid valve fluidly connected to the pulse valve to affect position of a plunger within an interior area of the pulse valve based on measurements electronically received by the control device from sensors, and a vault or cavity within the pulse valve fluidly connected to the solenoid valve operative for a flow of fluid from a fluid supply into the vault or cavity generating a pressure within the vault or cavity greater than a pressure of the compressed gas within the compressed gas tank or pressure vessel for a closed positioning of the plunger to block compressed gas flow from the compressed gas tank or pressure vessel through openings in the pulse valve to the pipe, and operative for fluid flow from the vault or cavity generating a pressure within the vault or cavity less than the pressure of the compressed gas for an opened positioning the plunger for a flow of compressed gas from the compressed gas tank or pressure vessel through openings in the pulse valve to the pipe for cleaning of particulate collection equipment. The sensors arranged in the plant are at least one of temperature sensors and pressure sensors. The pipe comprises an extended tab to abut a seal member at the pipe opening of the compressed gas tank or pressure vessel.

In summary, the present disclosure also provides a pulse valve comprising a solenoid valve with operation affecting positioning of a plunger arranged within an interior area of the pulse valve electronically controlled by a control device, fluidly connected to the pulse valve, the pulse valve arranged within an opening in a compressed gas tank or pressure vessel containing compressed gas, and connected to a pipe within the compressed gas tank or pressure vessel, the pipe fluidly connected to nozzles for cleaning of particulate collection equipment, and a vault or cavity within the pulse valve sized to accept a center extended portion of the plunger, fluidly connected to the solenoid valve operative based on measurements electronically received by the control device from sensors for fluid flow from a fluid supply into the vault or cavity generating a pressure within the vault or cavity greater than a pressure of the compressed gas within the compressed gas tank or pressure vessel for a closed positioning of the plunger to block compressed gas flow from the compressed gas tank or pressure vessel through openings in the pulse valve to the pipe, and operative for fluid flow from the vault or cavity generating a pressure within the vault or cavity less than the pressure of the compressed gas for an opened positioning the plunger for a flow of compressed gas from the compressed gas tank or pressure vessel through openings in the pulse valve to the pipe for cleaning of particulate collection equipment. With regard to the subject pulse valve, at least a portion of the pulse valve may be rectangular in shape dimensioned larger in width than length, sized for mating arrangement within the rectangular opening of the pressure vessel. Also, the subject pulse valve may be arranged within a rectangular opening with attachment to the pressure vessel consisting of attachment to a tubular pipe. Further, the subject pulse valve is operative for a pulse of about 10 psi to about 145 psi, or about 60 psi, and the sensors are at least one of temperature sensors and pressure sensors.

In summary, also a method of using a pulse valve is disclosed comprising connecting the pulse valve within an opening in a compressed gas tank or pressure vessel containing compressed gas to a pipe within the compressed gas tank or pressure vessel, affecting positioning of a plunger arranged within an interior area of the pulse valve by operation of a solenoid valve fluidly connected to the pulse valve, controlling operation of the solenoid valve with a control device, operating the solenoid valve based on measurements electronically received by the control device from sensors to control fluid flow from a fluid supply into a vault or cavity within the interior area of the pulse valve generating a pressure within the vault or cavity greater than a pressure of the compressed gas within the compressed gas tank or pressure vessel for a closed positioning of the plunger to block compressed gas flow from the compressed gas tank or pressure vessel through openings in the pulse valve to the pipe, and periodically operating the solenoid valve based on measurements electronically received by the control device from sensors to control fluid flow from the vault or cavity within the interior area of the pulse valve generating a pressure within the vault or cavity less than the pressure of the compressed gas for an opened positioning the plunger for a flow of compressed gas from the compressed gas tank or pressure vessel through openings in the pulse valve to the pipe for periodic cleaning of particulate collection equipment. The disclosed method further comprises attaching the pulse valve to the pressure vessel with attachment consisting of attachment of the pulse valve to the pipe. Further, the flow of compressed gas from the compressed gas tank or pressure vessel through openings in the pulse valve to the pipe for periodic cleaning of particulate collection equipment is about 10 psi to about 145 psi, or about 60 psi, and the sensors are at least one of temperature sensors and pressure sensors.

In summary, also disclosed is a method of installing the subject pulse valve comprising arranging the pulse valve within an opening in a compressed gas tank or pressure vessel containing compressed gas, arranging a pipe comprising an extended tab in a pipe opening of the compressed gas tank or pressure vessel with the extended tab abutting a seal member at the pipe opening of the compressed gas tank or pressure vessel, and connecting the pulse valve to the pipe within the compressed gas tank or pressure vessel. The method further comprises attaching the pulse valve to the compressed gas tank or pressure vessel with attachment consisting of the connecting of the pulse valve to the pipe. With regard to this method, arranging the pulse valve within the opening in the compressed gas tank or pressure vessel may comprise fabricating at least a portion of the pulse valve rectangular in shape, dimensioned larger in width than length, and extending the at least a portion of the pulse valve rectangular in shape, dimensioned larger in width than length through a rectangular opening of the compressed gas tank or pressure vessel.

BRIEF DESCRIPTION OF THE DRAWINGS

The present disclosure will now be described in more detail with reference to the accompanying drawings.

DETAILED DESCRIPTION

Figure 1:
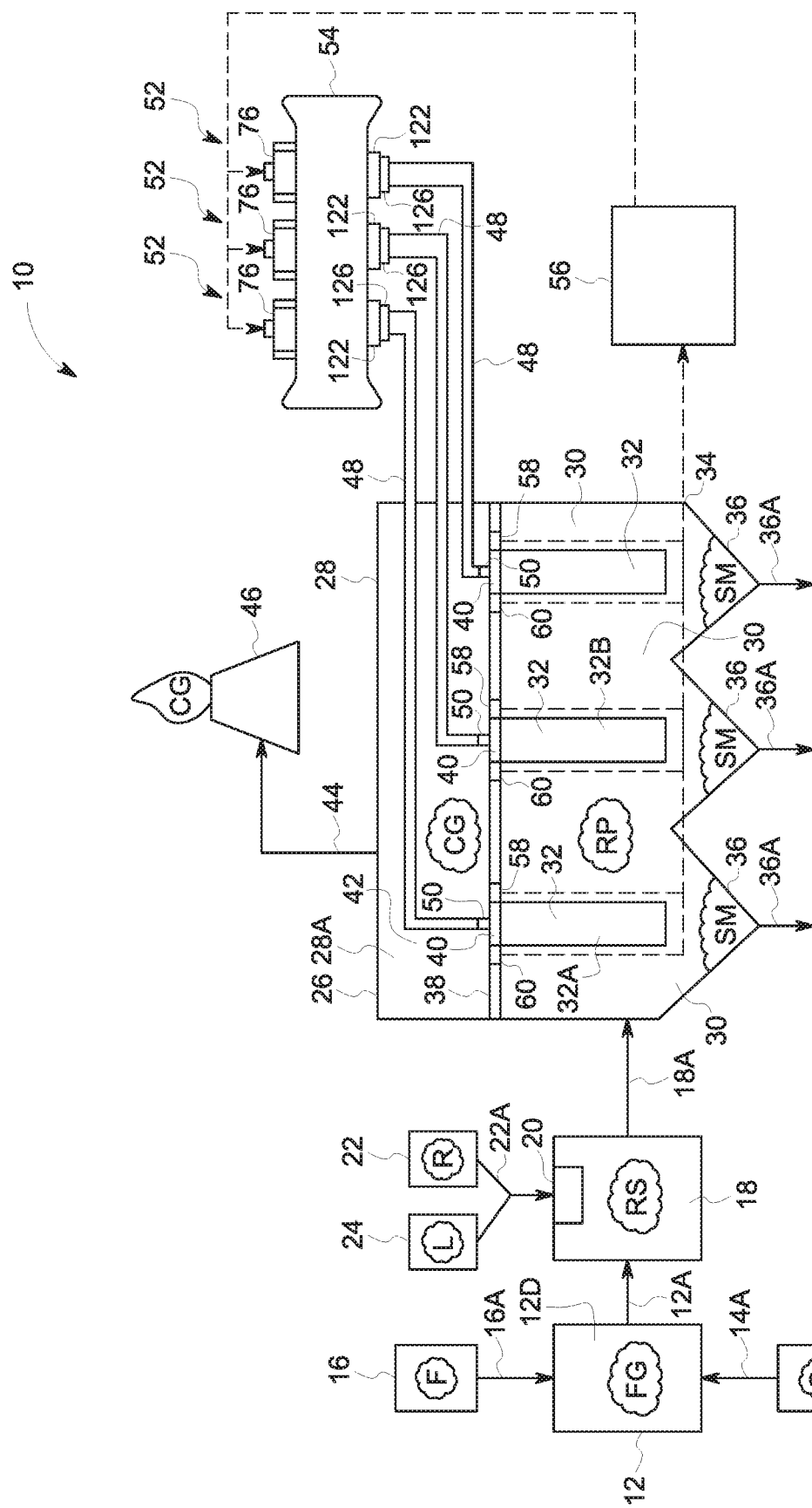
FIG. 1 is a schematic side cross sectional view of a plant with particulate collection equipment, and a cleaning system for the particulate collection equipment comprising a pressure vessel equipped with multiple pulse valves according to the present disclosure.

Referring to FIG. 1, disclosed herein is a plant 10 such as a power plant or an industrial plant that when in operation generates a polluted gas. An example of such a plant 10 for purposes of illustration not limitation, is a power plant that includes a combustion unit 12, such as a steam producing boiler unit, that when in operation generates a flue gas FG. The combustion unit 12 may be supplied at least one oxygen containing gas G, e.g., air, $O_2$ gas, or gases that include $O_2$ gas, from a gas supply 14 via a fluidly connected supply pipe 14A. Likewise, the combustion unit 12 is supplied a carbonaceous fuel F from a fuel supply 16 via a fluidly connected fuel duct 16A for combustion of the fuel F within the combustion unit 12. The fuel F supplied to combustion unit 12 is preferably a fossil fuel such as for example coal, oil, or natural gas. In addition to steam, flue gas FG is produced upon fuel F combustion within the combustion unit 12. Steam produced by fuel F combustion can be transported to a turbine (not shown) for use in generating electricity, or put to other uses such as for example district heating, combustion unit 12 pre-heating, or the like. Flue gas FG produced by fuel F combustion comprises acid gases, such as for example but not limited to sulfur oxides ($SO_x$) and hydrogen chloride (HCl), ash, heavy metals, and particulates. Flue gas FG produced in the combustion unit 12 flows out of an interior area 12D of the combustion unit 12 through a fluidly connected conduit 12A into a dry flue gas desulfurization DFGD system 18. DFGD system 18, for example, may be a vertical reactor DFGD system equipped with a distribution device as described in detail in U.S. Pat. No. 5,887,973. Alternatively, DFGD system 18 may be a spray dryer absorber DFGD system. For purposes of clarity, DFGD system 18 will be described herein as simply a spray dryer absorber DFGD system, although other DFGD systems may be used to achieve flue gas desulfurization. DFGD system 18 comprises a plurality of atomizers 20, which may be for example two to ten atomizers 20, but more preferably four to five atomizers 20. An example of an atomizer 20 suitable for the subject DFGD system 20 is a rotary model atomizer commercially available from GE-Power, located in Erlanger, Ky., USA. Alternatively, other commercially available atomizers 20 of a similar type, such as two-media nozzle atomizers or lances with multiple two-media nozzles, may likewise be utilized in the subject DFGD system 18. Each atomizer 20 is arranged and fluidly connected to receive a reagent slurry RS produced from reagent R supplied from a reagent supply 22 and liquid L supplied from a liquid supply 24 via ducts 22A. The atomizers 20 disperse the reagent slurry RS within the DFGD system 18 for intermixing contact with flue gas FG flowing therethrough. Upon contact with the flue gas FG, the reagent slurry RS reacts with the impurities in the flue gas FG thereby producing a dry powder reaction product RP and flue gas FG of a reduced impurity content. The dry powder reaction product RP produced in the flue gas FG upon contact of the flue gas FG with the reagent slurry RS is largely entrained in the flue gas FG. The flue gas FG with entrained dry powder reaction product RP flows from DFGD system 18 via duct 18A into fluidly connected particulate collection equipment 26.

Particulate collection equipment 26 comprises a housing 28 with at least two fabric filter compartments 30. The at least two fabric filter compartments 30 may be for example two to twelve fabric filter compartments 30, but more preferably six to ten fabric filter compartments 30. Schematically illustrated in FIG. 1, particulate collection equipment 26 comprises three fabric filter compartments 30. Fabric filter compartments 30 are dimensioned to accommodate a plurality of hanging fabric filter bags 32 about 6 meters (about 19 feet) to about 12 meters (about 40 feet), but most typically about 10 meters (about 33 feet), in length. However, for purposes of clarity, in FIG. 1, only a single fabric filter bag 32 is illustrated in each fabric filter compartment 30. Flue gas FG with entrained dry powder reaction product RP and other particulates, such as ash and dust, flows out from DFGD system 18 into particulate collection equipment 26 via duct 18A. At bottom 34 of housing 28, below each fabric filter compartment 30 is a hopper 36 equipped with an outlet 36A. Within interior area 28A of housing 28 is a horizontal plate 38 with a plurality of openings 40 therethrough. Hanging fabric filter bags 32 are removably attached in openings 40 in horizontal plate 38. Typically, a fabric filter compartment 30 may comprise 2 to 20,000 such fabric filter bags 32. In operation, flue gas FG with entrained dry powder reaction product RP and other particulates, such as ash and dust, flows through the fabric 32A of the fabric filter bags 32, through openings 40 in horizontal plate 38 into the "clean" upper portion 42 of interior area 28A of housing 28 above horizontal plate 38, thereby producing a cleaned flue gas CG. The cleaned flue gas CG flows from upper portion 42 through duct 44 to a fluidly connected stack 46 for release to the environment. The entrained dry powder reaction product RP and other particulates, such as ash and dust, for the most part do not pass through the fabric 32A of the fabric filter bags 32. As such, the entrained dry powder reaction product RP and other particulates, such as ash and dust, collect on the outside surface 32B of the fabric filter bags 32. Occasionally, it is necessary to remove collected or caked dry powder reaction product RP and other particulates from the outside surface 32B of the fabric filter bags 32. Nozzle pipes 48 are arranged in the upper portion 42 of housing 28. Each nozzle pipe 48 is provided with a pulsing nozzle 50 for each of the openings 40 with removably attached fabric filter bags 32. Each nozzle pipe is fluidly connected to a pulse valve 52 fluidly connected to a compressed gas tank or pressure vessel 54. The compressed gas tank or pressure vessel 54 typically has an absolute pressure of about 10 psi to about 145 psi, or about 60 psi, to be suitable for cleaning the outside surface 32B of fabric filter bags 32 with periodic blasts of a pressurized gas, such as air, carbon dioxide, or other relatively low cost gas. These periodic blasts of pressurized gas are electronically controlled through the use of a control unit 56, to remove the collected or caked dry powder reaction product RP and other particulates from the outside surface 32B of the fabric filter bags 32. As such, control unit 56 determines the timing for removal of collected or caked dry powder reaction product RP and other particulates from the outside surface 32B of the fabric filter bags 32. Control unit 56 determines the timing for such removal based on, for example, a certain length of time having elapsed since the last removal, a certain pressure drop in flue gas FG flow as measured by pressure sensors 58 at openings 40, or a certain drop in temperature as measured by temperature sensors 60 at openings 40. Upon passage of a predetermined length of time measured by the control unit 56, the control unit 56 electronically signals the pulse valve 52 to "open" for a short period of time, typically 150 to 500 ms, as described in more detail below. Alternatively, upon a predetermined pressure drop being measured by the pressure sensors 58 and received by control unit 56, the control unit 56 electronically signals the pulse valve 52 to "open" for a short period of time, typically a period of time of 150 to 500 ms. As yet another alternative, upon a predetermined temperature drop being measured by the temperature sensors 60 and received by control unit 56, the control unit 56 electronically signals the pulse valve 52 to "open" for a short period of time, typically a period of time of 150 to 500 ms. This opening of the pulse valve 52 for a short period of time results in a short pulse of pressurized gas flowing through nozzle pipe 48, through fluidly connected pulsing nozzles 50, through openings 40, and into fabric filter bags 32. As an effect of such pulse of pressurized gas, the fabric filter bags 32 expand rapidly, causing most, if not all, of the collected or caked dry powder reaction product RP and other particulates on the outside surface 32B of the fabric filter bags 32 to be released. The released dry powder reaction product RP and other particulates fall downwardly into hoppers 36 of the fabric filter compartments 30. Occasionally the dry powder reaction product RP and other particulates collected in hoppers 36 as solid material SM is removed through outlet 36A and discarded in an environmentally conservative manner or removed through outlet 36A for use elsewhere within plant 10.

Figure 2:
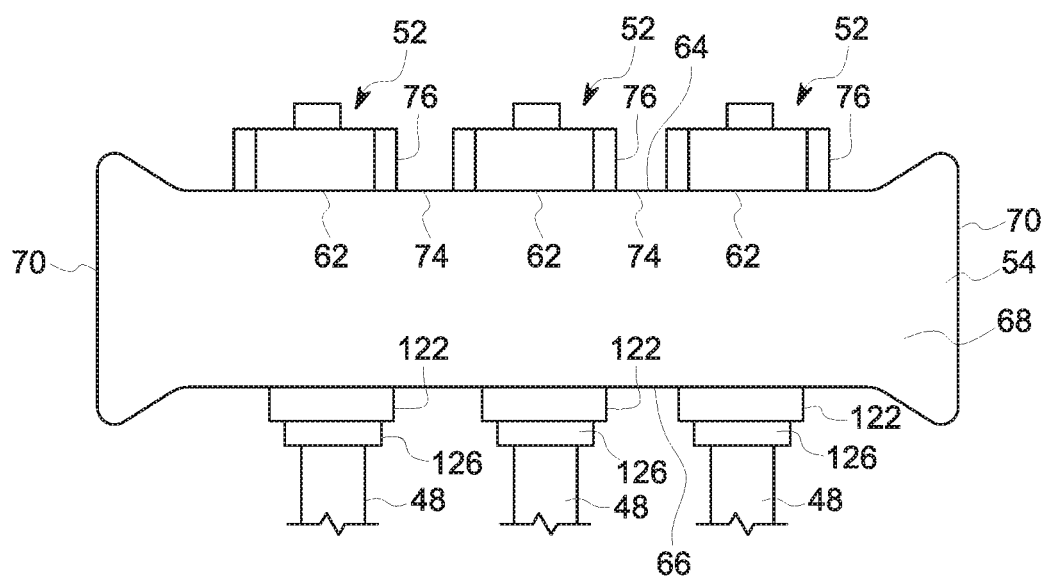
FIG. 2 is an enlarged schematic side view of the pressure vessel equipped with multiple pulse valves and nozzle pipes according to FIG. 1.
Figure 4:
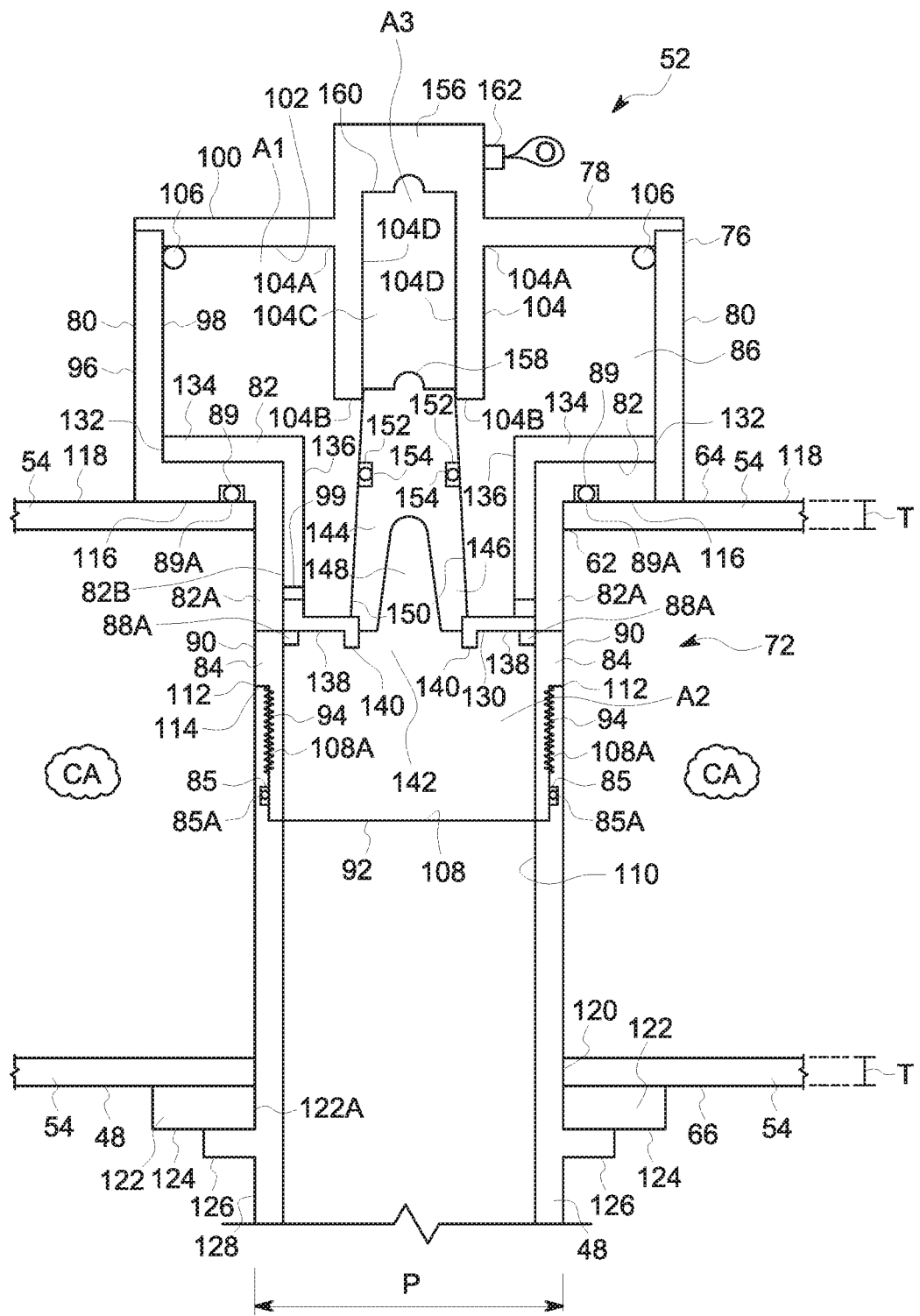
FIG. 4 is an enlarged schematic side cross-sectional view of a part of the pressure vessel of FIG. 2 equipped with a pulse valve with a plunger in a second "closed" position.
Figure 5:
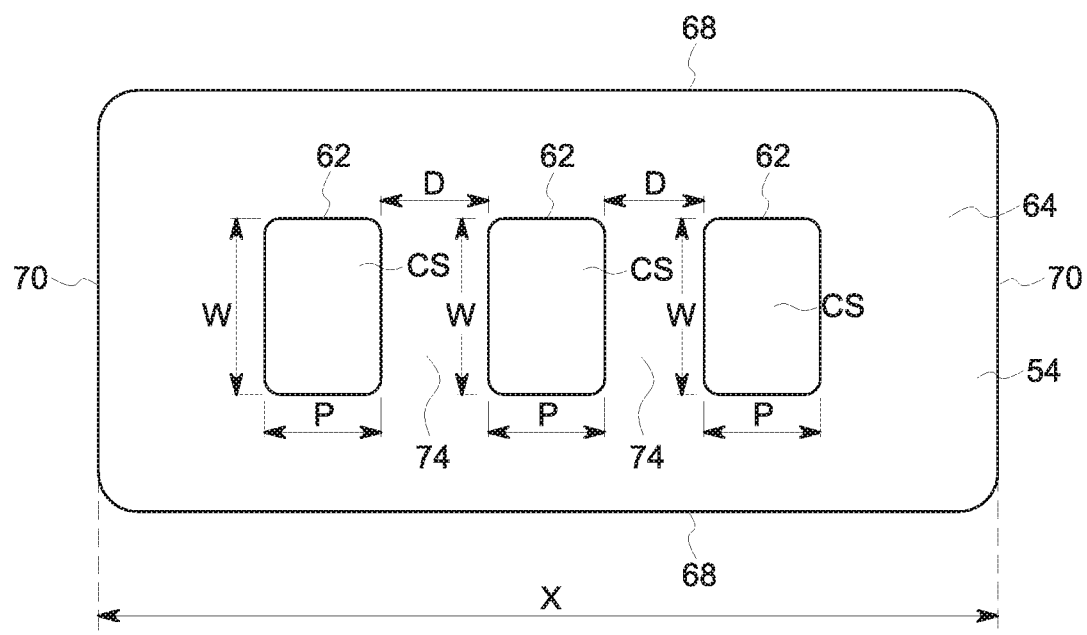
FIG. 5 is a schematic top view of the pressure vessel of FIG. 2 with valve openings for installation of pulse valves therein according to the present disclosure.

Best illustrated in FIGS. 2 and 5, are pulse valves 52 with a relatively small penetration cross section areas CS defined by rectangular valve openings 62 in compressed gas tank or pressure vessel 54. The relatively small penetration cross section area CS defined by rectangular valve opening 62 is about 50 square centimeters (8 square inches) to about 385 square centimeters (60 square inches), or about 160 square centimeters (25 square inches). Compressed gas tank or pressure vessel 54 is generally cylindrical comprising a top 64, a bottom 66, opposed sides 68, and opposed ends 70, together defining an open interior area 72 in which compressed gas is contained. Compressed gas tank or pressure vessel 54 has a longitudinal axis X extending between opposed ends 70. Rectangular valve openings 62 are dimensioned relatively shorter in length P, parallel to the longitudinal axis X, than in width W, perpendicular to the longitudinal axis X. The relatively longer width W, perpendicular to the longitudinal axis X, accommodates relatively larger, higher performance pulse valves 52 operable for compressed gas pulses of about 10 psi to about 145 psi, or about 60 psi, for about 50 ms to about 500 ms, or about 200 ms, while also maximizing the length D of bands 74 of top 64 extending between the rectangular valve openings 62 thereby maximizing the strength of compressed gas tank or pressure vessel 54. By maximizing the length D of bands 74 extending between the rectangular valve openings 62, thickness T, illustrated in FIGS. 3 and 4, requirements of the compressed gas tank or pressure vessel 54 are reduced, thereby reducing costs associated therewith. Further, the subject pulse valve 52 requires no bolting, and no or decreased installation/replacement welding, thereby reducing costs associated therewith.

Depending on the size and number of high performance pulse valves 52 required, relative to the size of the compressed gas tank or pressure vessel 54, it may also be possible to maximize the length D of bands 74 for required compressed gas tank or pressure vessel 54 strength without additional thickness T using high performance pulse valves 52 of a shape other than rectangular, such as for example square or round. However, for purposes of clarity and simplicity, a rectangular high performance pulse valve 52 and benefits thereof are described herein for purposes of illustration not limitation.

Figure 3:
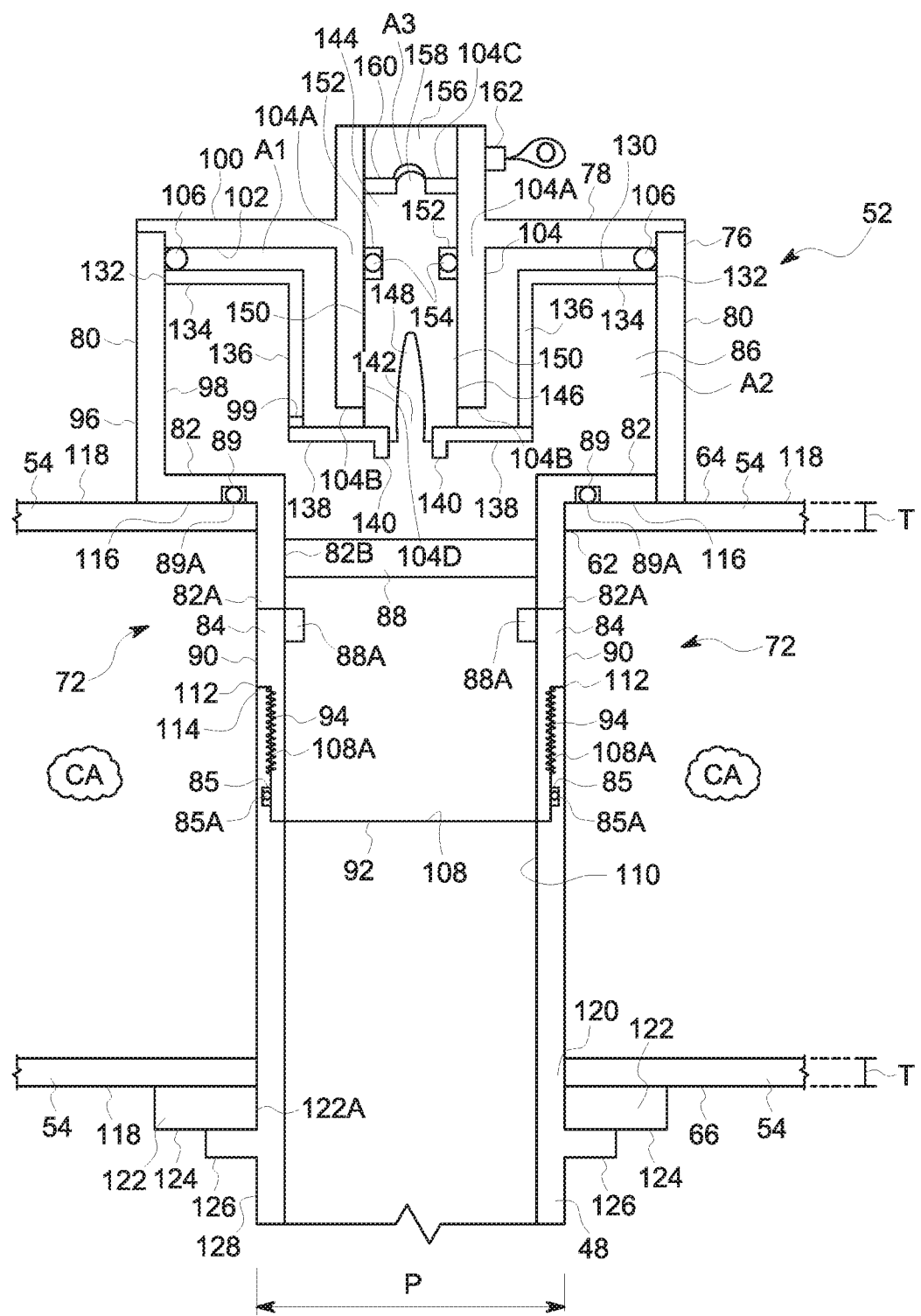
FIG. 3 is an enlarged schematic side cross-sectional view of a part of the pressure vessel of FIG. 2 equipped with a pulse valve with a plunger in a first "opened" position.

As illustrated in FIG. 3, the subject pulse valve 52 comprises a valve housing 76. Valve housing 76 is manufactured of a sturdy natural, e.g., iron, aluminum, or other metal, or synthetic, e.g., plastic, resin or other polymer, material suitably rigid and durable for robust industrial uses and forces. Valve housing 76 is generally rectangular in shape and unitarily formed or fabricated comprising a top 78, four sides 80, an inwardly extending base 82, a rectangular opening portion 82A, and tubular extension 84, together defining an open interior area 86. Although valve housing 76, rectangular opening portion 82A, and tubular extension 84 define open interior area 86, portions of open interior area 86 may be of the same or of a differing geometry from that of valve housing 76, rectangular opening portion 82A, and/or tubular extension 84. For example, while rectangular opening portion 82A is rectangular in shape, the geometry of the open interior area 86 defined thereby may be square or tubular, depending upon design preferences. Rectangular opening portion 82A is sized for mating arrangement within rectangular valve opening 62 illustrated in FIG. 5. As such, as illustrated in FIG. 3 and FIG. 4, rectangular opening portion 82A generally having a length P parallel to the longitudinal axis X of compressed gas tank or pressure vessel 54, measures the same as the diameter of tubular extension 84, although such measurements may be varied. Rectangular opening portion 82A comprises one or more openings 88 therethrough. Optionally, rectangular opening portion 82A may also comprise one continuous or one or more discrete inwardly extending tabs 88A. On an exterior surface 90 at a free end 92 of tubular extension 84 is threading 94. Sides 80 also include an exterior surface 96 and an interior surface 98. Top 78 of valve housing 76 includes an exterior surface 100 and an interior surface 102. Extending from interior surface 102 of top 78 is an extended member 104. Extended member 104 is formed with an attached end 104A opposite a free end 104B. Extended member 104 defines an open interior cavity 104C. Extending from interior surface 102 between interior surface 98 of side 80 and extended member 104 are one or more dampening mechanisms or cushions 106. Cushions 106 may be manufactured from natural or synthetic rubber, polyurethane, silicone or a like flexible material capable of providing cushioning effects upon repeated impact between solid surfaces of pulse valve 52. Free end 92 of tubular extension 84 defines an opening 108. Tubular extension 84 with threading 94 is sized to threadedly engage threading 108A on interior surface 110 of nozzle pipe 48 at nozzle pipe 48 free end 112. Nozzle pipe 48 free end 112 defines opening 114. As such, tubular extension 84 is secured within opening 114 by threading 94 of tubular extension 84 removably interlocking with threading 108A of nozzle pipe 48. This interlocking of tubular extension 84 with nozzle pipe 48 forms a fluid connection therebetween. On interior surface 110 of nozzle pipe 48 abutting exterior surface 90 of tubular extension 94, is a channel 85 with a pliable material 85A, such as an O-ring, therein to ensure an airtight seal between tubular extension 94 and nozzle pipe 48. In removably interlocking tubular extension 94 and nozzle pipe 48, rectangular opening portion 82A of pulse valve 52 is positioned within rectangular valve opening 62 of compressed gas tank or pressure vessel 54 with exterior surface 116 of inwardly extending base 82 of valve housing 76 abutting exterior surface 118 of compressed gas tank or pressure vessel 54. In exterior surface 116 of inwardly extending base 82 of valve housing 76 is a channel 89 with a pliant sealing member 89A, such as an O-ring, therein creating an airtight seal between exterior surface 118 of compressed gas tank or pressure vessel 54 and exterior surface 116 of inwardly extending base 82 of valve housing 76. By attaching pulse valve 52 to compressed gas tank or pressure vessel 54 as described, valve housing 76 is of a relatively reduced size as compared to pulse valves of similar performance requiring bolting to a compressed gas tank or a pressure vessel.

As further illustrated in FIGS. 3 and 4, nozzle pipe 48 extends from free end 112 through a pipe opening 120 in bottom 66 of compressed gas tank or pressure vessel 54 arranged opposite rectangular valve opening 62 in top 64. Abutting exterior surface 118 of compressed gas tank or pressure vessel 54 at pipe opening 120 is a seal member 122. Abutting an exterior surface 124 of seal member 122 is an extended tab 126 integrally formed with or attached to exterior surface 128 of nozzle pipe 48. Upon threadedly connecting tubular extension 84 to nozzle pipe 48, an airtight seal is formed at pipe opening 120 by seal member 122 abutted by extended tab 126. Through the airtight seal formed by the inwardly extending base 82 abutting exterior surface 118 and by the seal member 122 abutting exterior surface 118 upon removably connecting valve housing 76 with nozzle pipe 48, bolting of valve housing 76 to compressed gas tank or pressure vessel 54 is not required, thereby avoiding costs associated therewith.

As still further illustrated in FIGS. 3 and 4, slideably positioned within open interior area 86 of valve housing 76 is a plunger 130. Plunger 130 is likewise manufactured of a sturdy natural, e.g., iron, aluminum, or other metal, or synthetic, e.g., plastic, resin or other polymer, material suitably rigid and durable for robust industrial uses and forces. Free ends 132 of outwardly extended tabs 134 of sides 136 of plunger 130 are in slidable, abutting contact with interior surfaces 98 of sides 80 of valve housing 76 for a relatively airtight seal therebetween. Extending inwardly from sides 136 of plunger 130 opposite outwardly extended tabs 134 is base 138. Base 138 extending inwardly from sides 136 terminates in tab 140 defining an opening 142. Integrally formed with or attached to tab 140 is an upwardly extending member 144 with side portions 146. Upwardly extending member 144 is sized for arrangement within open interior vault or cavity 104C to form a relatively airtight seal between side portions 146 and interior surface 104D of extended member 104 defining open interior vault or cavity 104C. Upwardly extending member 144 may optionally include an arched recessed open interior area 148 defined by side portions 146 for component strength with reduced material costs. Further, exterior surface 150 of side portions 146 may optionally include an indentation 152 with an O-ring 154 arranged within the indentation 152 for purposes of achieving a more airtight seal between side portions 146 and interior surface 104D of extended member 104 defining open interior vault or cavity 104C.

The area A1 of interior area 86 above plunger 130 varies as plunger 130 moves or slides within valve housing 76. The area A1 of interior area 86 above plunger 130 is minimized when base 138 of plunger 130 moves upwardly toward top 78 of valve housing 76 for abutting contact of outwardly extended tabs 134 with pliable dampening mechanisms or cushions 106 at interior surface 102 of top 78 of valve housing 76. Air in interior area 86 flows from decreasing area A1 of interior area 86 primarily by leakage around free ends 132 of outwardly extended tabs 134 of plunger 130 into increasing area A2 of interior area 86 below plunger 130. Alternatively, one or more air holes 99 may be provided through outwardly extended tabs 134, sides 136 and/or base 138 of plunger 130 for air flow. As such, through the one or more air holes 99, air may flow from decreasing area A1 of interior area 86 above plunger 130 to increasing area A2 of interior area 86 below plunger 130. In this first "opened" position illustrated in FIG. 3, outwardly extended tabs 134 contact pliable dampening mechanisms or cushions 106 with upwardly extending member 144 occupying the open interior vault or cavity 104C defined by extended member 104 of valve housing 76 causing fluid "O" to flow from open interior vault or cavity 104C through a solenoid valve 156 integrally formed with or securely affixed to the valve housing 76. In this first "opened" position, open interior vault or cavity 104C is an area A3 of low pressure causing a top 158 of upwardly extending member 144 to slide into contact with sealing seat 160 of solenoid valve 156. Hence, in the first "opened" position, area A1 and area A3 are areas of relatively low pressure having a pressure less than the pressure within area A2 and open interior area 72 of compressed gas tank or pressure vessel 54, e.g., about 10 psi to about 145 psi, or about 60 psi. When the plunger 130 is in this first "opened" position, a pulse of compressed gas CA from compressed gas tank or pressure vessel 54 flows from the compressed gas tank or pressure vessel 54, through openings 88 in rectangular opening portion 82A, through tubular extension 84, through nozzle pipe 48, through pulsing nozzle 50, through opening 40 and into fabric filter bags 32. As an effect of such pulse of compressed gas CA, the fabric filter bags 32 expand rapidly, causing most, if not all, of the collected or caked dry powder reaction product RP and other particulates on the outside surface 32B of the fabric filter bags 32 to be released, thereby cleaning the fabric filter bags 32.

Now, referring to FIG. 4, the area A2 of interior area 86 is minimized when pressure within area A3 of open interior vault or cavity 104C is increased by a flow of fluid O from a fluid source 162 through fluidly connected solenoid valve 156 into open interior vault or cavity 104C. As fluid O flows into open interior vault or cavity 104C, upwardly extending member 144 of plunger 130 is moved by the fluid O outwardly from open interior vault or cavity 104C away from sealing seat 160 until outwardly extended tabs 134 of plunger 130 abut or contact inwardly extending base 82 and/or base 138 of plunger 130 abuts or contacts the one continuous or one or more discrete inwardly extending tabs 88A. By having base 138 of plunger 130 abut or contact the one continuous or one or more discrete inwardly extending tabs 88A, stresses at the junction of outwardly extended tabs 134 and sides 136 are reduced, thereby increasing the commercial life of plunger 130 and reducing operational costs associated therewith. Upon outwardly extended tabs 134 of plunger 130 contacting inwardly extending base 82 and/or base 138 of plunger 130 abutting or contacting the one continuous or one or more discrete inwardly extending tabs 88A, sides 136 of plunger 130 slide within and into relatively airtight contact with interior 82B of rectangular opening portion 82A, thereby blocking openings 88. In this second "closed" position with openings 88 blocked by sides 136 of plunger 130, compressed gas CA is blocked from flowing from the compressed gas tank or pressure vessel 54, through the openings 88 of valve housing 76 and into fluidly connected nozzle pipe 48. As such, air in decreasing area A2 of interior area 86 below plunger 130 primarily flows into nozzle pipe 48 upon pressure increase within increasing area A1 of interior area 86 above plunger 130. Hence, in the second "closed" position illustrated in FIG. 4, area A1 and area A3 are areas of relatively high pressure having a pressure greater than the pressure within area A2 and open interior area 72 of compressed gas tank or pressure vessel 54, e.g., about 10 psi to about 145 psi, or about 60 psi.

A method of installing the subject pulse valve 52 comprises arranging a seal member 122 in abutting contact with exterior surface 118 of pressure vessel 54 at pipe opening 120, extending nozzle pipe 48 through opening 122A in seal member 122 and through pipe opening 120 until extended tab 126 of nozzle pipe 48 abuts seal member 122, extending tubular extension 84 of pulse valve 52 through valve opening 62 of compressed gas tank or pressure vessel 54, and connecting tubular extension 84 to nozzle pipe 48 to form a fluid connection therebetween. When tubular extension 84 is threadedly connected to nozzle pipe 48, inwardly extending base 82 of pulse valve 52 abuts exterior surface 118 of pressure vessel 54 at valve opening 62.

A method of using the subject pulse valve 52 for cleaning at least a portion of the fabric filter bags 32 within a fabric filter compartment 30 of particulate collection equipment 26 comprises signaling solenoid valve 156 with a control device 56 to cause solenoid valve 156 to decrease fluid O pressure within area A3 of open interior cavity 104C of pulse valve 52 and within area A1 above plunger 130 to cause pressure movement of plunger 130 into a first "opened" position allowing a flow of compressed gas CA from compressed gas tank or pressure vessel 54, through openings 88, and into nozzle pipe 48 in fluid connection therewith. This pulse of compressed gas CA into nozzle pipe 48 causes the fabric filter bags 32 expand rapidly, causing most, if not all, of the collected or caked dry powder reaction product RP and other particulates on the outside surface 32B of the fabric filter bags 32 to be released, thereby cleaning the fabric filter bags 32. After the cleaning pulse of compressed gas CA, the method comprises signaling solenoid valve 156 with the control device 56 to cause solenoid valve 156 to increase fluid O pressure within area A3 of open interior vault or cavity 104C of pulse valve 52 and within area A1 above plunger 130 to cause pressure movement of plunger 130 into a second "closed" position blocking flow of compressed gas CA from compressed gas tank or pressure vessel 54 through openings 88 and nozzle pipe 48 in fluid connection therewith until the next particulate collection equipment 26 cleaning.

The subject method further comprises providing a dampening mechanism or cushion 106 within the valve housing 76 to reduce or cushion the impact between the outwardly extended tabs 134 of plunger 130 with the valve housing 76 interior surface 102 upon movement of the plunger 130 into the first opened position. Providing dampening mechanisms or cushions 106 as herein described also reduces the impact noise of the plunger 130 with the valve housing 76 upon movement of the plunger 130 into the first opened position.

Additionally, dampening mechanisms or cushions 106 enables use of an increased compressed gas CA pressure for relatively higher performance fabric filter bag 32 cleaning without jeopardizing pulse valve 52 reliability. Without dampening mechanisms or cushions 106, increased compressed gas CA pressure within compressed gas tank or pressure vessel 54 jeopardizes pulse valve 52 reliability due to damage or wear caused by increased mechanical stresses from the resultant higher velocity impact of the plunger 130 with the valve housing 76. Dampening mechanisms or cushions 106 cushion the impact of plunger 130 within valve housing 76 thus lessening mechanical stresses of such impacts and reducing damage or wear to the pulse valve 52. Hence, with dampening mechanisms or cushions 106, pulse valve 52 reliability is not jeopardized with increased compressed gas CA pressure in compressed gas tank or pressure vessel 54.

In summary, the present disclosure provides a plant 10 comprising a pulse valve 52 arranged in a rectangular valve opening 62 in a compressed gas tank or pressure vessel 54 containing compressed gas CA, and connected to a pipe 48 arranged in a pipe opening 120 of the compressed gas tank or pressure vessel 54, a control device 56 operable to electronically control operation of a solenoid valve 156 fluidly connected to the pulse valve 52 to affect position of a plunger 130 within an interior area 86 of the pulse valve 52 based on measurements electronically received by the control device 56 from sensors 58, 60, and a vault or cavity 104C within the pulse valve 52 connected to the solenoid valve 156 operative for a flow of fluid O from a fluid supply 162 into the vault or cavity 104C generating a pressure within the vault or cavity 104C greater than a pressure of the compressed gas CA within the compressed gas tank or pressure vessel 54 for a closed positioning of the plunger 130 to block compressed gas CA flow from the compressed gas tank or pressure vessel 54 through openings 88 in the pulse valve 52 to the pipe 48, and operative for fluid O flow from the vault or cavity 104C generating a pressure within the vault or cavity 104C less than the pressure of the compressed gas CA for an opened positioning the plunger 130 for a flow of compressed gas CA from the compressed gas tank or pressure vessel 54 through openings 88 in the pulse valve 52 to the pipe 48 for cleaning of particulate collection equipment 26. The sensors 58, 60 arranged in the plant 10 are at least one of temperature sensors 60 and pressure sensors 58. The pipe 48 comprises an extended tab 126 to abut a seal member 122 at the pipe opening 120 of the compressed gas tank or pressure vessel 54.

In summary, the present disclosure also provides a pulse valve 52 comprising a solenoid valve 156 with operation affecting positioning of a plunger 130 arranged within an interior area 86 of the pulse valve 52 electronically controlled by a control device 56, fluidly connected to the pulse valve 52, the pulse valve 52 arranged within a rectangular opening 62 in a compressed gas tank or pressure vessel 54 containing compressed gas CA, and connected to a pipe 48 within the pressure vessel 54, the pipe 48 fluidly connected to nozzles 50 for cleaning of particulate collection equipment 26, and a vault or cavity 104C within the pulse valve 52 sized to accept a center extended portion 144 of the plunger 130, fluidly connected to the solenoid valve 156 operative based on measurements electronically received by the control device 56 from sensors 58, 60 for fluid O flow from a fluid supply 162 into the vault or cavity 104C generating a pressure within the vault or cavity 104C greater than a pressure of the compressed gas CA within the compressed gas tank or pressure vessel 54 for a closed positioning of the plunger 130 to block compressed gas CA flow from the compressed gas tank or pressure vessel 54 through openings 88 in the pulse valve 52 to the pipe 48, and operative for fluid O flow from the vault or cavity 104C generating a pressure within the vault or cavity 104C less than the pressure of the compressed gas CA for an opened positioning the plunger 130 for a flow of compressed gas CA from the compressed gas tank or pressure vessel 54 through openings 88 in the pulse valve 52 to the pipe 48 for cleaning of particulate collection equipment 26. With regard to the subject pulse valve 52, at least a portion of the pulse valve 52 is rectangular in shape dimensioned larger in width W than length P, sized for arrangement within the rectangular opening 62 of the compressed gas tank or pressure vessel 54. Also, the subject pulse valve 52 is arranged within the rectangular opening 62 with attachment to the compressed gas tank or pressure vessel 54 consisting of attachment to the pipe 48. Further, the subject pulse valve 52 is operative for a pulse of compressed gas CA of about 10 psi to about 145 psi, or about 60 psi, and the sensors 58, 60 are at least one of temperature sensors 60 and pressure sensors 58.

In summary, also a method of using a pulse valve 52 is disclosed comprising connecting the pulse valve 52 within a rectangular opening 62 in a compressed gas tank or pressure vessel 54 containing compressed gas CA to a pipe 48 within the compressed gas tank or pressure vessel 54, affecting positioning of a plunger 130 arranged within an interior area 86 of the pulse valve 52 by operation of a solenoid valve 156 fluidly connected to the pulse valve 52, controlling operation of the solenoid valve 156 with a control device 56, operating the solenoid valve 156 based on measurements electronically received by the control device 56 from sensors 58, 60 for fluid O flow from a fluid supply 162 into a vault or cavity 104C within the interior area 86 of the pulse valve 52 generating a pressure within the vault or cavity 104C greater than a pressure of the compressed gas CA within the compressed gas tank or pressure vessel 52 for a closed positioning of the plunger 130 to block compressed gas CA flow from the compressed gas tank or pressure vessel 54 through openings 88 in the pulse valve 52 to the pipe 48, and periodically operating the solenoid valve 156 based on measurements electronically received by the control device 56 from sensors 58, 60 for fluid O flow from the vault or cavity 104C within the interior area 86 of the pulse valve 52 generating a pressure within the vault or cavity 104C less than the pressure of the compressed gas CA for an opened positioning the plunger 130 for a flow of compressed gas CA from the compressed gas tank or pressure vessel 54 through openings 88 in the pulse valve 52 to the pipe 48 for periodic cleaning of particulate collection equipment 26. The disclosed method further comprises attaching the pulse valve 52 to the compressed gas tank or pressure vessel 54 with attachment consisting of attachment of the pulse valve 52 to the pipe 48. Further, the flow of compressed gas CA from the pressure vessel 54 through openings 88 in the pulse valve 52 to the pipe 48 for periodic cleaning of particulate collection equipment 26 is about 10 psi to about 145 psi, or about 60 psi, and the sensors 58, 60 are at least one of temperature sensors 60 and pressure sensors 58.

In summary, also disclosed is a method of installing the subject pulse valve 52 comprising arranging the pulse valve 52 within a rectangular opening 62 in a compressed gas tank or pressure vessel 54 containing compressed gas CA, arranging a pipe 48 comprising an extended tab 126 in a pipe opening 120 of the compressed gas tank or pressure vessel 54 with the extended tab 126 abutting a seal member 122 at the pipe opening 120 of the compressed gas tank or pressure vessel 54, and connecting the pulse valve 52 to the pipe 48 within the compressed gas tank or pressure vessel 54. The method further comprises attaching the pulse valve 52 to the compressed gas tank or pressure vessel 54 with attachment consisting of the connecting of the pulse valve 52 to the pipe 48. With regard to this method, arranging the pulse valve 52 within the rectangular opening 62 in the compressed gas tank or pressure vessel 54 comprises fabricating at least a portion of the pulse valve 52 rectangular in shape, dimensioned larger in width W than length P, and extending the at least a portion of the pulse valve 52 rectangular in shape, dimensioned larger in width W than length P through the rectangular opening 62 of the compressed gas tank or pressure vessel 54.

While preferred embodiments are illustrated and described herein, various modifications and substitutions may be made thereto without departing from the spirit and scope of the subject disclosure. Accordingly, it is to be understood that the subject disclosure has been described by way of illustration and not limitation.

The invention claimed is:

1. A pulse valve comprising:
a housing having a plurality of sidewalls, a top, a base, an opening portion extending from the base and having at least one opening, and an extension extending from the opening portion, the extension having threading at an end thereof;
a pliant sealing member received in a channel in the base of the housing;
a solenoid valve mounted to the housing, with operation affecting positioning of a slideable plunger that is arranged within an interior area of the housing, the solenoid valve being electronically controlled by a control device; the pulse valve arranged within an opening in a pressure vessel containing compressed gas, and the pulse valve connected via the threading of the extension to a pipe within the pressure vessel; the pipe comprising a seal member abutting the pressure vessel, wherein the pipe is fluidly connected to nozzles for cleaning of particulate collection equipment; and
a cavity within the housing sized to accept a center extended portion of the plunger, wherein the cavity is fluidly connected to the solenoid valve, wherein the solenoid valve is operative based on measurements electronically received by the control device from sensors to generate fluid flow from a fluid supply into the cavity thereby generating a pressure within the cavity greater than a pressure of the compressed gas within the pressure vessel for a closed positioning of the plunger to block compressed gas flow from the pressure vessel through the at least one opening of the opening portion to the pipe, and
wherein the solenoid valve is operative for fluid flow from the cavity thereby generating a pressure within the cavity less than the pressure of the compressed gas in order to place the plunger in an opened position to allow for a flow of compressed gas from the pressure vessel through the at least one opening of the opening portion to the pipe for cleaning of particulate collection equipment; and
wherein the pliant sealing member creates a fluid-tight seal between the housing and an exterior surface of the pressure vessel as a result of tensile forces generated via the threaded connection between the extension and the pipe.

2. The pulse valve of claim 1, wherein at least a portion of the pulse valve is rectangular in shape when viewed looking along an axis of travel of the plunger, is dimensioned larger in width than length, sized for arrangement within the opening of the pressure vessel.

3. The pulse valve of claim 1, wherein the pulse valve is arranged within the opening for attachment to the pressure vessel by attachment to the pipe.

4. The pulse valve of claim 1, wherein the pulse valve is operative for a pulse of about 10 psi to about 145 psi.

5. The pulse valve of claim 1, wherein the sensors are selected from the group consisting of at least one of temperature sensors and pressure sensors.

6. The pulse valve of claim 1, wherein:
the seal member is compressed between an exterior surface of the pressure vessel and a flange of the pipe as a result of tensile forces generated via the threaded connection between the pulse valve and the pipe.

7. The pulse valve of claim 6, wherein:
the channel that receives the pliant sealing member is formed in an underside surface of the base of the housing.

8. The pulse valve of claim 1, further comprising:
at least one tab extending laterally inward into an interior area of the opening portion, the at least one tab being configured to limit travel of the plunger moving towards the closing position.

9. A pulse valve, comprising:
a housing having a plurality of sidewalls, a top, a base having a channel in an underside surface of the base, an opening portion extending from the base and having at least one opening, and an extension extending from the opening portion, the extension having threading at an end thereof, the opening portion matingly engaging a valve opening of a pressure vessel containing compressed gas;
a pliant sealing member received in the channel in the base;
a solenoid valve mounted to the housing, with operation affecting positioning of a slideable plunger that is arranged within an interior area of the housing, and the extension connected via the threading of the extension to a pipe within the pressure vessel;
a cavity within the housing sized to accept a center extended portion of the plunger, wherein the cavity is fluidly connected to the solenoid valve, wherein the solenoid valve is operative to generate fluid flow from a fluid supply into the cavity thereby generating a pressure within the cavity greater than a pressure of the compressed gas within the pressure vessel for a closed positioning of the plunger to block compressed gas flow from the pressure vessel through the at least one opening of the opening portion to the pipe; and at least one tab extending laterally inward into an interior area of the opening portion, the at least one tab being configured to limit travel of the plunger moving towards the closed position;

wherein the solenoid valve is operative for fluid flow from the cavity thereby generating a pressure within the cavity less than the pressure of the compressed gas in order to place the plunger in an opened position to allow for a flow of compressed gas from the pressure vessel through the at least one opening of the opening portion to the pipe for cleaning of particulate collection equipment; and wherein the pliant sealing member creates a fluid-tight seal between the housing and an exterior surface of the pressure vessel as a result of tensile forces generated via the threaded connection between the extension and the pipe.

* * * * *